United States Patent [19]

Lech, Jr.

[11] Patent Number: 4,643,287
[45] Date of Patent: Feb. 17, 1987

[54] MULTI-STAGE TORSIONAL DAMPING DEVICE

[75] Inventor: Thaddeus Lech, Jr., Sterling Heights, Mich.

[73] Assignee: Borg-Warner Corporation, Chicago, Ill.

[21] Appl. No.: 749,910

[22] Filed: Jun. 28, 1985

Related U.S. Application Data

[62] Division of Ser. No. 423,878, Sep. 27, 1982, Pat. No. 4,548,311.

[51] Int. Cl.[4] .................. F16D 3/14; F16D 37/00
[52] U.S. Cl. .................... 192/106.2; 192/103 B; 192/105 BB; 464/68
[58] Field of Search .............. 192/106.2, 30 V, 103 B, 192/105 BA, 105 BB, 106.1; 464/64, 66, 67, 68

[56] References Cited

U.S. PATENT DOCUMENTS

| | | | |
|---|---|---|---|
| 1,969,561 | 8/1934 | Keller | 192/105 BB |
| 3,534,841 | 10/1970 | Schneider et al. | 192/106.2 |
| 4,185,728 | 1/1980 | Gatewood | 192/106.2 |
| 4,239,097 | 12/1980 | Greacen et al. | 192/106.2 |
| 4,412,606 | 11/1983 | Loizeau | 192/106.2 |
| 4,485,908 | 12/1984 | Gatewood | 192/106.2 |
| 4,526,260 | 7/1985 | Schierling | 192/106.2 |

FOREIGN PATENT DOCUMENTS

| | | | |
|---|---|---|---|
| 678363 | 7/1939 | Fed. Rep. of Germany | 464/66 |
| 1233273 | 5/1971 | United Kingdom | 192/106.2 |

*Primary Examiner*—Rodney H. Bonck
*Assistant Examiner*—David A. Testardi
*Attorney, Agent, or Firm*—James A. Geppert

[57] ABSTRACT

A multi-stage torsional damping device for a vehicle clutch having a low-rate primary stage to eliminate transmission gear rattle occurring during neutral transmission position and a normal rate resilient and friction damping stage. The first stage consists of a low spring rate, substantially frictionless floating suspension of an inner hub within an outer hub to allow the outer hub to oscillate with engine impulses. A medium rate substantially frictionless second stage may be utilized to cushion the torque transference from the first stage to the normal rate last stage and provides compaction of some of the compression springs for the last stage for a given deflection without friction until the hub parts abut, and the third stage consists of compaction of all of the compression springs and additional deflection with friction. Alternatively, centrifugal weights may be used to lock the inner and outer hubs together at a predetermined rotation level, after which a normal damping operation is effected.

8 Claims, 22 Drawing Figures

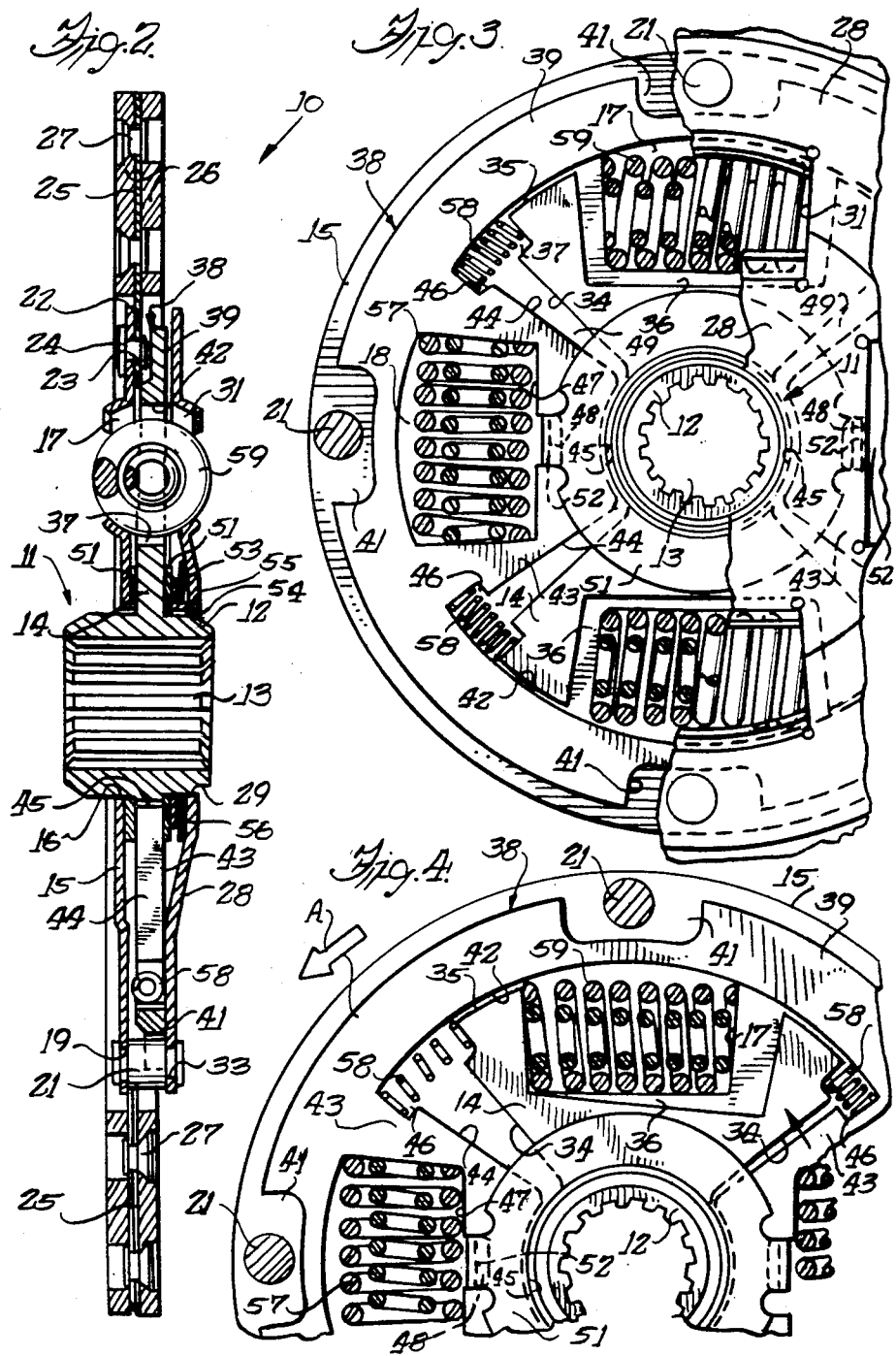

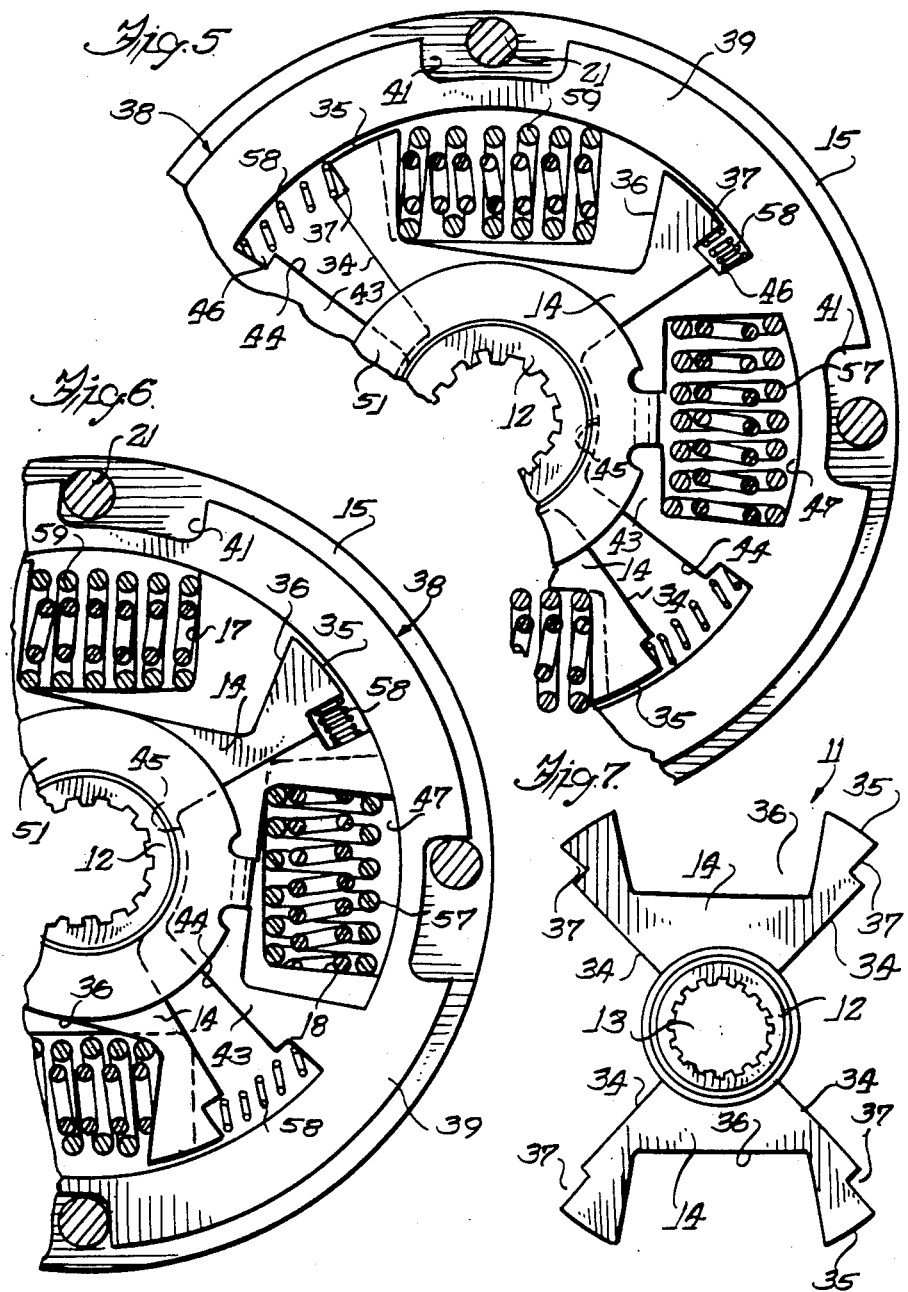

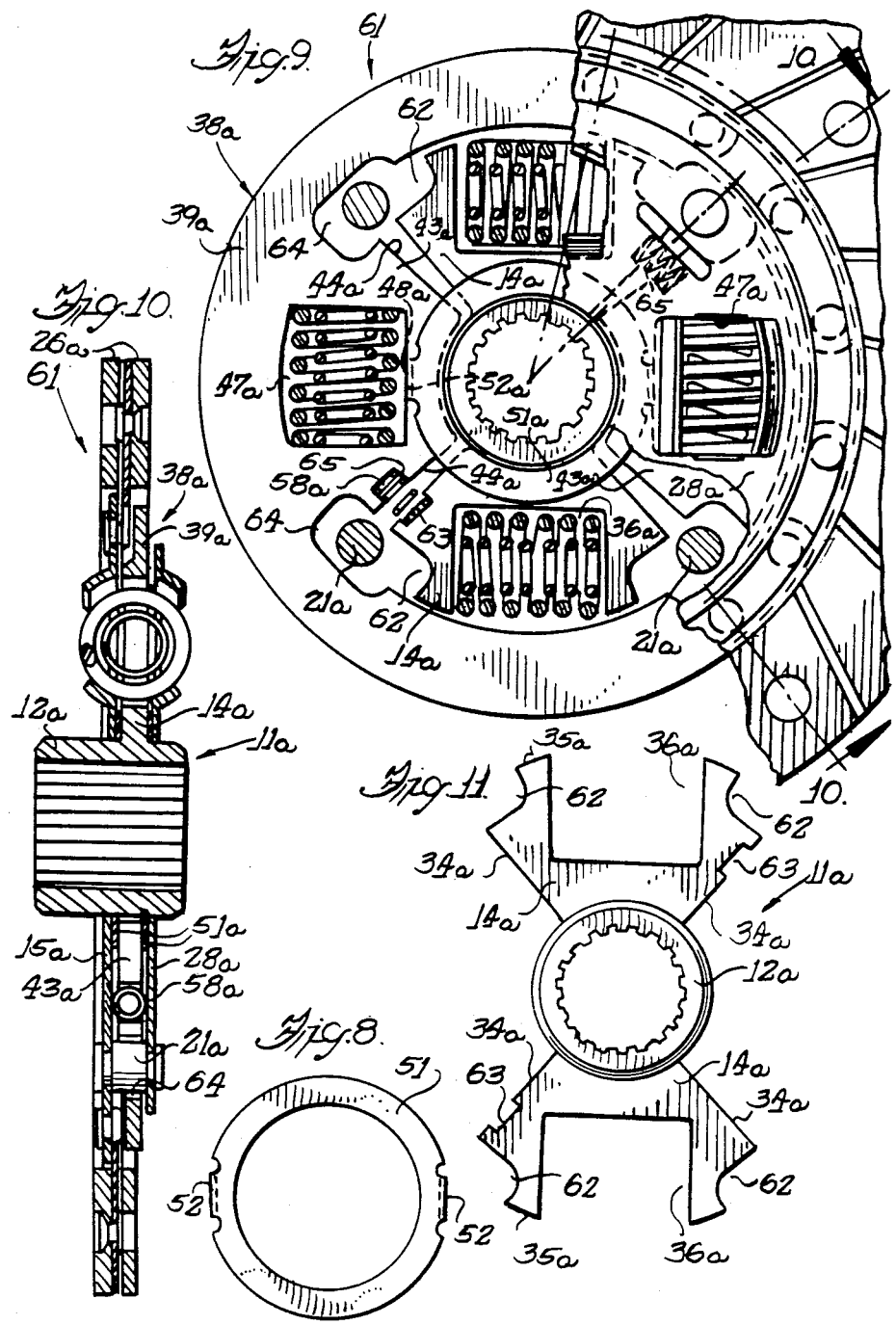

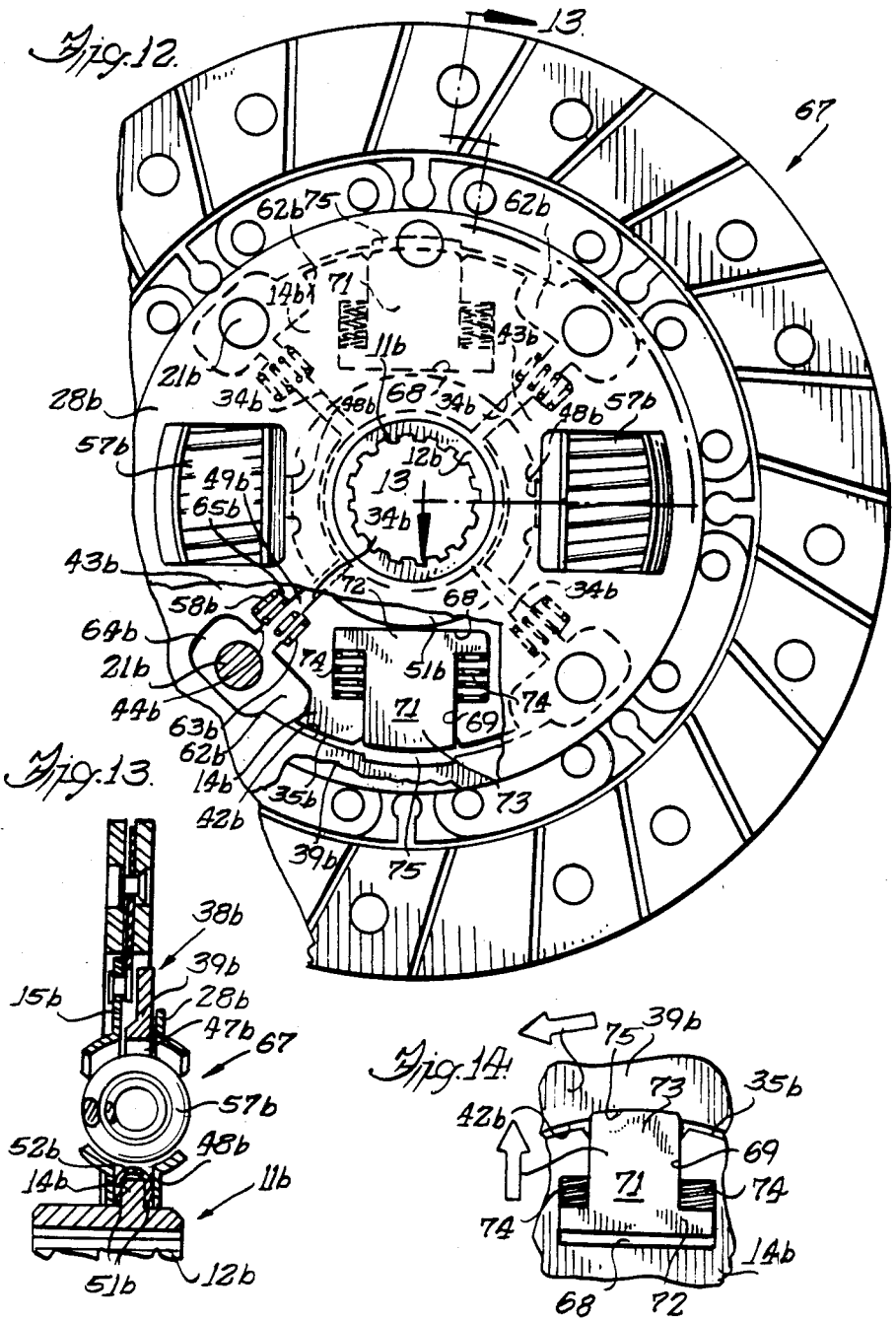

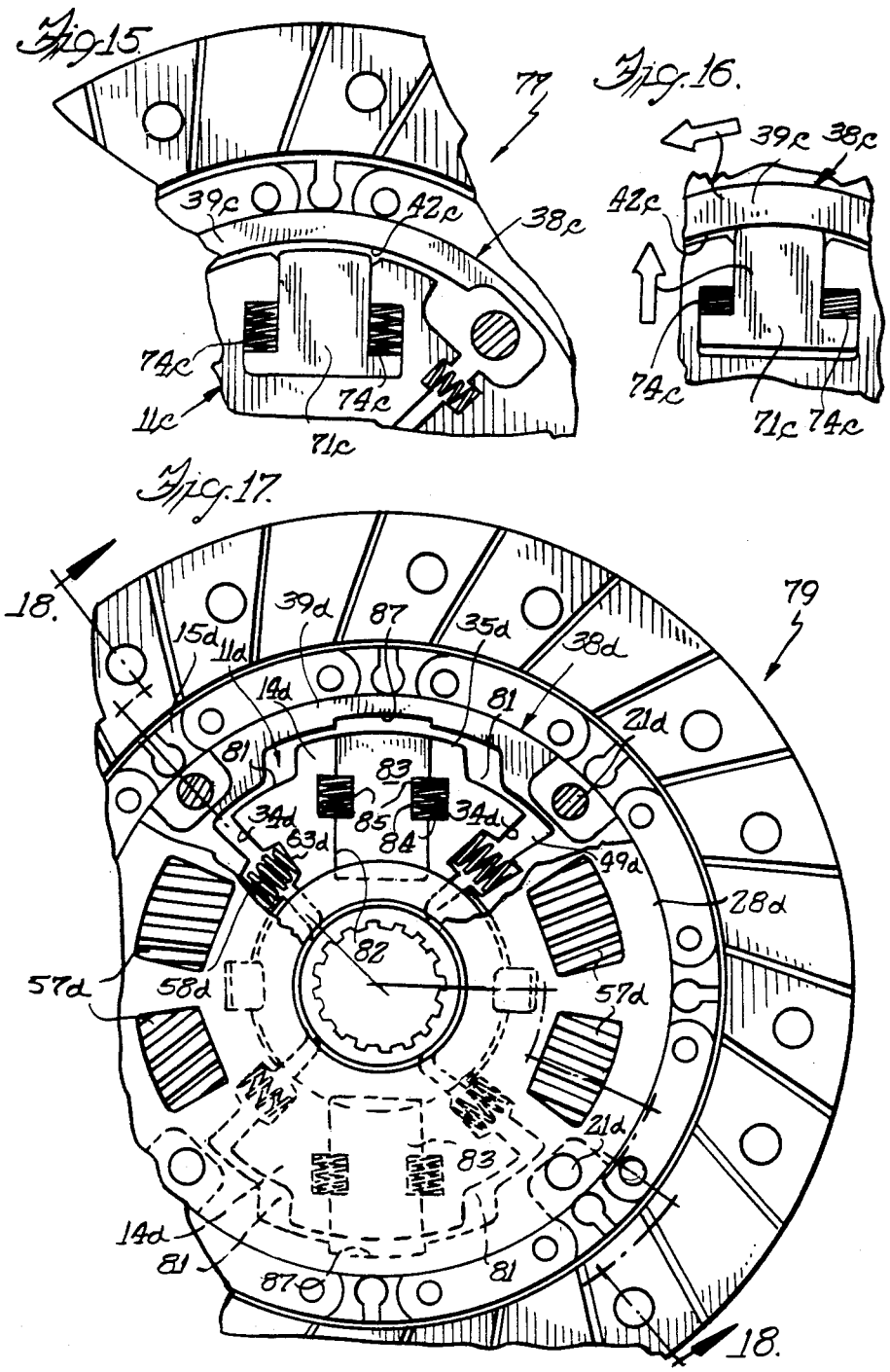

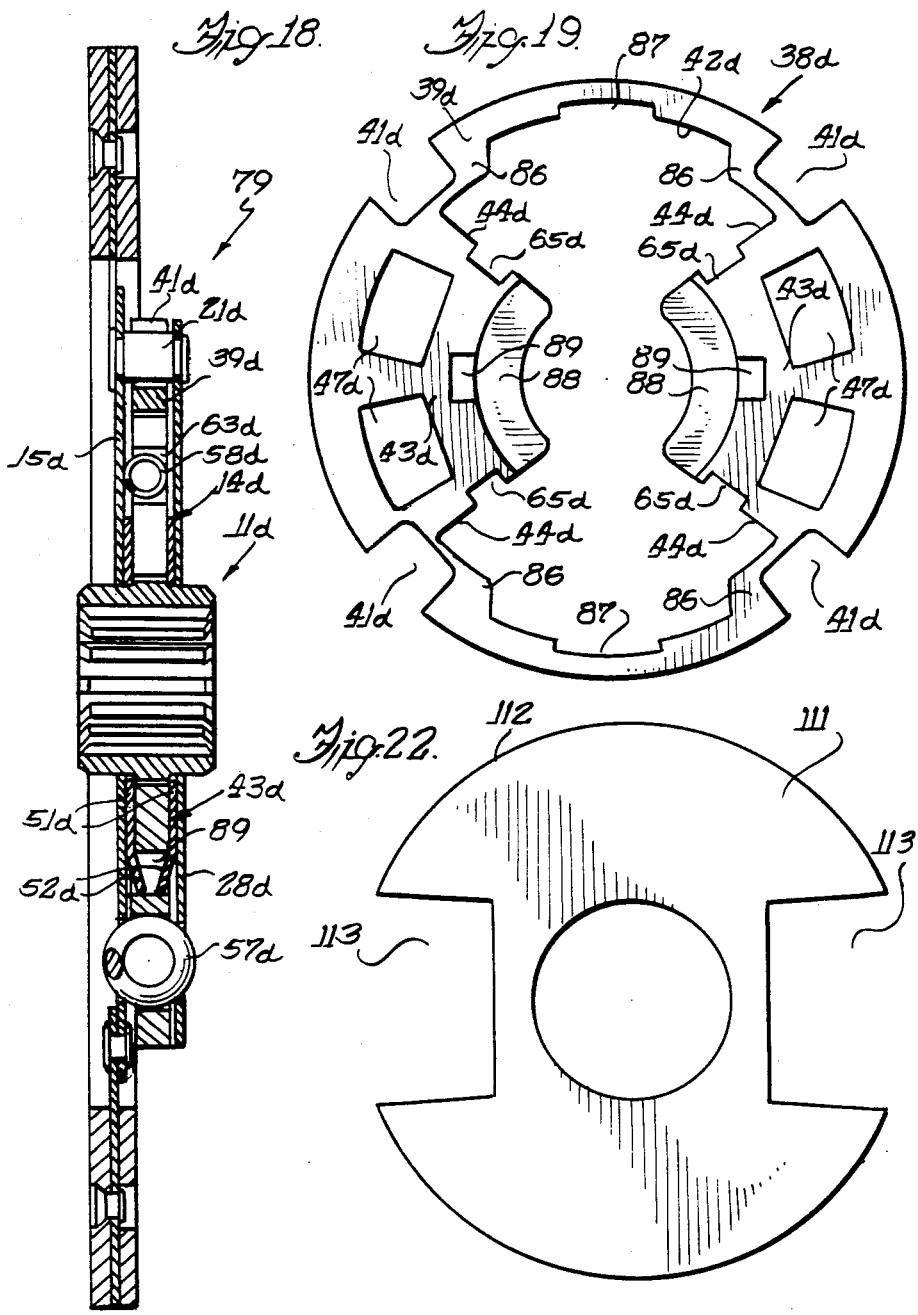

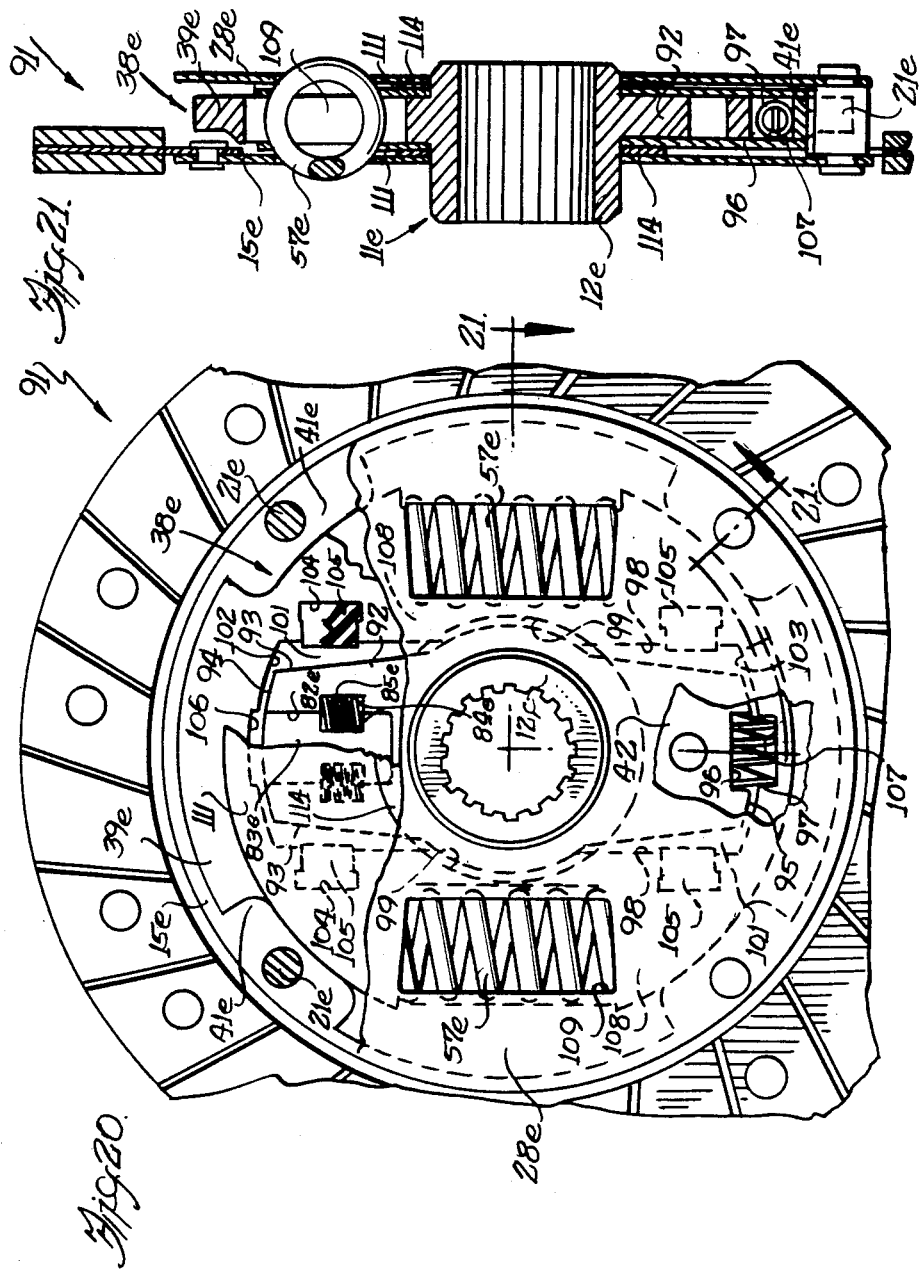

MULTI-STAGE TORSIONAL DAMPING DEVICE

This is a division of application Ser. No. 423,878, filed Sept. 27, 1982, now U.S. Pat. No. 4,548,311.

BACKGROUND OF THE INVENTION

Vibration damping means are generally utilized for a friction clutch in the drive line of an automotive vehicle between the engine and the manually operated transmission to overcome objectionable rattle and vibration when the clutch is engaged and provides a torsional coupling between the engine and transmission. A conventional vibration damper and clutch assembly includes a hub having an internally splined barrel receiving the externally splined end of the transmission input shaft and an integral radial flange, a clutch plate journalled on the hub and carrying the friction facings at its periphery, a spring retainer plate journalled on the hub on the opposite side of the flange from the clutch plate and connected thereto by stop pins extending through peripheral notches in the hub flange, and damper springs which are located within axially aligned sets of spring windows formed in the clutch plate, hub flange and spring retainer plate.

The above described clutch and vibration damper assembly provides for a substantially constant rate of energy dissipation, and friction washers may be sandwiched between the plates and hub flange to provide for an additional friction damping action to supplement the resilient damping action of the springs. However, this damper assembly has proved to be inadequate where specialized problems occur at idle conditions or under engine full load. One specific problem resides in transmission gear rattle in the neutral position with the clutch engaged at idle rpm. The gear rattle is caused by motor impulses urging the gears of the transmission to oscillate through their tooth backlash space; the impacting of the gear teeth producing the objectionable rattle.

The present invention resides in a multi-stage vibration damper assembly which will overcome the problem of objectionable gear rattle at idle rpm and also cushion the torque transference between damping stages without impacting the damper parts.

SUMMARY OF THE INVENTION

The present invention comprehends the provision of a novel multi-stage torsional vibration damper which will provide a low spring rate, substantially frictionless first stage to eliminate idle gear rattle in series with a substantially frictionless medium spring rate second stage and a high spring rate third stage with damping friction. The second stage acts to cushion impacting of the damper parts during torque transference from the low rate first stage to the high rate third stage. The first stage comprises a low rate compression spring, substantially frictionless, floating suspension of an inner hub within an outer hub using a pair of second stage springs as its rotational travel stop. This floating spring suspension allows the outer hub to oscillate with engine impulses without transmitting them to the inner hub and vehicle transmission gears.

The present invention also comprehends the provision of a novel three stage torsional vibration damper assembly utilizing resiliently cushioned inner and outer hubs to provide a floating spring suspension as well as damper springs between the outer hub and the clutch and spring retainer plates to provide for the second and third stages of travel. The second stage is accomplished by the compression of two of the four damper springs for the third stage for a given deflection until the inner and outer hubs contact; wherein the inner and outer hubs will squeeze together rather than impact. These same two springs will compress for a further deflection along with the two remaining springs and the addition of damping friction for the third stage of travel.

The present invention further comprehends the provision of a novel multi-stage torsional vibration damper assembly having a low spring rate first stage to eliminate transmission gear rattle occurring during the neutral transmission position due to engine impulses at idle rpm. At a predetermined increased rpm, the first stage cushioning effect becomes inactive by the action of centrifugal weights which lock the inner and outer hubs together and allow a normal rate final stage damping to operate in a conventional manner.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the damper assembly taken on the irregular line 2—2 of FIG. 1.

FIG. 3 is a partial rear elevational view similar to FIG. 1 with portions broken away.

FIG. 4 is a partial rear elevational view with parts broken away showing movement in the first stage of travel.

FIG. 5 is a partial rear elevational view similar to FIG. 4 but showing the parts at the end of the second stage of travel.

FIG. 6 is a partial rear elevational view similar to FIG. 4 but showing the parts at the end of the third stage of travel.

FIG. 7 is a rear elevational view of the inner hub.

FIG. 8 is an elevational view of a friction plate for the damper assembly.

FIG. 9 is a rear elevational view with parts broken away showing a second embodiment of the vibration damper device.

FIG. 10 is a cross sectional view taken on the irregular line 10—10 of FIG. 9.

FIG. 11 is a rear elevational view of the inner hub for the damper of FIG. 9.

FIG. 12 is a partial rear elevational view with portions broken away of a third embodiment of the damper assembly.

FIG. 13 is a partial cross sectional view taken on the irregular line 13—13 of FIG. 12.

FIG. 14 is an enlarged rear elevational view of a centrifugal weight coacting between the inner and outer hubs of FIG. 12.

FIG. 15 is a partial rear elevational view with parts removed showing a fourth embodiment of the damper assembly.

FIG. 16 is an enlarged rear elevational view showing the centrifugal weight coacting with the hubs of FIG. 15.

FIG. 17 is a partial rear elevational view with portions broken away of a fifth embodiment of the vibration damper assembly.

FIG. 18 is a partial cross sectional view taken on the irregular line 18—18 of FIG. 17.

FIG. 19 is a rear elevational view of the outer hub of FIG. 17.

FIG. 20 is a rear elevational view with portions broken away of a sixth embodiment of the damper assembly.

FIG. 21 is a cross sectional view taken on the irregular line 21—21 of FIG. 20.

FIG. 22 is an elevational view of a friction back plate for the assembly of FIG. 20.

DESCRIPTION OF THE PREFERRED EMBODIMENTS

Figure 1:
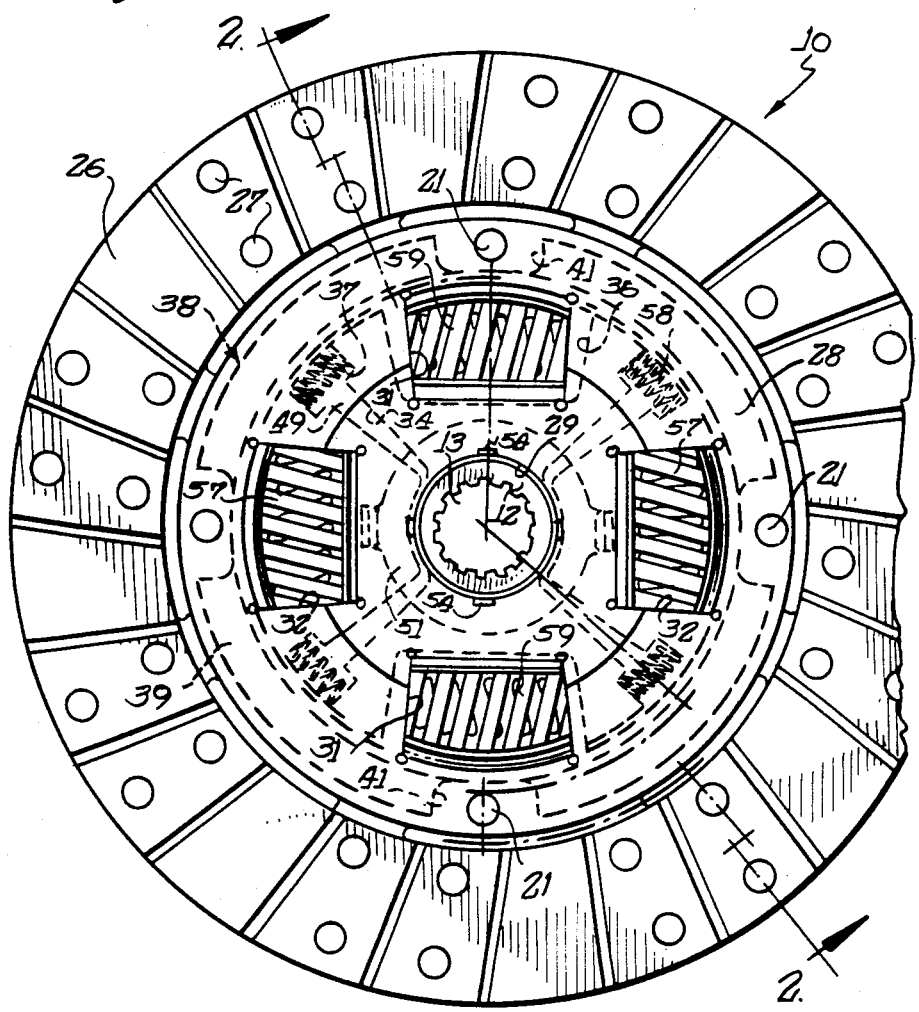
FIG. 1 is a rear elevational view of a vehicle friction clutch assembly employing the novel multi-stage damper of the present invention.

Referring more particularly to the disclosure in the drawings wherein are shown illustrative embodiments of the present invention, FIGS. 1 through 8 disclose a friction clutch and vibration damper assembly 10 with a hub assembly including an inner hub 11 (FIG. 7) having a barrel 12 with an internally splined central passage 13 and oppositely disposed flange portions 14,14. A generally planar clutch driven plate 15 has a central opening 16 journalled on the barrel 12 and includes two pairs of oppositely disposed spring windows 17 and 18, four openings 19 radially beyond the windows for receiving the ends of stop pins 21, and a plurality of openings 23 adjacent the outer periphery 22 for rivets 24 to secure cushion springs 25 thereto. A pair of oppositely disposed annular friction facings 26 are secured, as by rivets 27, to the cushion springs.

A spring retainer plate 28 is also generally planar and has a central opening 29 encompassing the barrel 12, two pairs of spring windows 31,32 axially aligned with the windows 17,18, respectively, and openings 33 adjacent the periphery to receive the opposite ends of stop pins 21 securing the plates together in spaced relation. As seen in FIG. 7, each flange portion or arm 14 is provided with outwardly diverging edges 34 terminating in an arcuate periphery 35 having an elongated notch 36 adapted to be axially aligned with but of a greater length than the spring windows 17 and 31. Also, each diverging edge 34 terminates in a corner notch 37 adjacent the periphery 35 for a purpose to be later described.

The hub assembly also includes an outer hub 38 comprising an annular ring 39 having elongated notches 41 in the outer periphery receiving the stop pins 21 extending between the plates 15 and 28 and an inner periphery 42 conformably receiving the arcuate peripheries 35 of the inner hub flange portions 14. Extending radially inwardly from the ring 39 are flange portions 43 having inwardly converging edges 44 terminating in concave ends 45 conformably receiving the inner hub barrel 12 between the inner hub flange portions 14. The edges 44 have corner notches 46 at the intersection with the inner periphery 42, and each portion contains a spring window 47 axially aligned with and of the same length as the spring windows 18 and 32 in the plates.

Each window has a central notch 48 on the inner edge thereof to receive locating tabs 52 on a pair of annular friction plates 51,51 (FIG. 8) located on the opposite surfaces of the inner hub flange portions 14 and outer hub flange portions 43; the inner hub flange portions 14 being thinner than the outer hub flange portions 43 so that the inner hub 11 may freely move between the friction plates 51,51. Also located between the rear friction plate 51 and the spring retainer plate 28 is an annular thrust plate 53 (FIG. 2) having a plurality of axially extending tabs 54 received in notches 55 in the retainer plate 28, and a Belleville spring or washer 56 is positioned between the thrust plate and spring retainer plate to urge the thrust plate against the rear friction plate 51 to control the friction damping characteristics of the friction plates during use.

In the neutral transmission position, the engine impulses cause torque to be applied through the friction facings 26, clutch and spring retainer plates 15 and 28 and damper springs 57 in the axially aligned windows 18, 32 and 48 to rotate the outer hub 38 (arrow A in FIG. 4) to compress a pair of diametrically opposed small idle rattle damper springs 58 received in the facing corner notches 37 and 46 in the inner and outer hub arms 14 and 43, respectively; the springs 58 acting in the radial gaps 49 between the inner and outer hub flange portions to cushion the engine impulses from being transmitted to the inner hub 11 and thus to the transmission gearing. In the drive transmission position, the small springs 58 are immediately compressed, and the plates 15 and 28 move a pair of damper springs 59 in windows 17,31 against the notches 36 in the inner hub flange portions 14, compressing them partially to cushion the impact of the outer hub 38 against the inner hub 11 at gaps 49. When the gaps 49 are closed, the plates 15 and 28 also drive springs 57 against the outer hub 38 abutting inner hub 11.

Plates 15 and 28 can now rotate compressing both sets of springs 57 and 59 until the stop pins 21 abut the edges of the notches 41 in the outer hub 38. The inner hub 11 moves freely between the friction plates 51,51, but the outer hub 38 is tabbed to the plates and moves with friction relative to the plates 15 and 28 and thrust plate 53.

FIGS. 9 through 11 disclose a second embodiment 61 of clutch damper assembly similar to the assembly of FIGS. 1 through 8 with like parts receiving the same reference numeral with a script a. In this embodiment, the clutch plate 15a carrying the friction facings 26a and the spring retainer plate 28a are secured together in spaced relation by stop pins 21a to encompass the outer hub 38a and the inner hub flange portions 14a. As seen in FIG. 11, the inner hub 11a has a barrel 12a and oppositely disposed flange portions 14a with diverging edges 34a and arcuate peripheral surfaces 35a containing damper spring notches 36a. A corner notch 62 is provided in each of the flange corners to form part of the elongated notch for the stop pins 21a. Also, on oppositely disposed edges of the flange portions are provided small spring recesses 63 to receive the ends of a pair of small damper springs 58a.

The outer hub 38a again includes an annular ring 39a with inwardly extending flange portions 43a having spring windows 47a with notches 48a to receive the tabs 52a of friction plates 51a. A pair of oppositely disposed converging edges 44a contain spring recesses 65 facing the recesses 63 and the corners where the flange portions intersect the ring have elongated notches 64 which form approximately three-fourths of a slot for a stop pin; the corner notch 62 forming the remainder of the slot. As in the previous embodiment, the notches 36a have a greater length than the aligned spring windows in the plates 15a and 28a. This assembly operates in substantially the same manner as the first embodiment and, although not shown, a thrust plate and Belleville washer as shown in FIG. 2 could be utilized with the friction plate if better control of the friction damping in the third stage of travel is desired.

A third embodiment of clutch damper assembly 67 is shown in FIGS. 12 through 14 wherein like parts will receive the same numeral with a script b. This embodiment includes an inner hub 11b with oppositely disposed flange portions 14b having diverging edges 34b terminating in arcuate peripheries 35b; the edges including corner notches 62b for stop pins 21b and spring recesses 63b for small damper springs 58b. A generally T-shaped notch 68 is formed in each flange portion 14b with the narrow or stem portion 69 of the notch opening into the periphery 35b. A generally T-shaped centrifugal weight 71 is located in each notch 68 and has a head 72 and a stem 73 projecting through the narrow portion 69. The notch 68 is of a greater width than that of the head 72 to receive a pair of retractor springs 74,74 yieldably urging the weight radially inward toward the barrel 12b.

The outer hub 38b comprises an annular ring 39b having oppositely disposed flange portions 43b with spring windows 47b for damper springs 57b, corner notches 64b and spring recesses 65b in the edges 44b facing the recesses 63b for springs 58b. Also, the inner periphery 42b of the annular ring has a pair of oppositely disposed notches 75,75 normally radially aligned with the portions 69 of notches 68 to receive the ends of stems 73 of the weights 71. Further, the windows 47b have notches 48b to receive the tabs 52b of friction plates 51b. Although not shown, a thrust plate and Belleville washer could be positioned between the friction plate 51b and the spring retainer plate 28b, in the manner shown in FIG. 2, to control the friction damping characteristics, if necessary.

For the first stage of damping to cushion the engine impulses while the clutch is engaged and in neutral transmission position at idle rpm, the radial gap 49b between the inner and outer hub flange portions permits relative rotation of the outer hub 38b relative to the inner hub 11b, and the small damper springs 58b cushion the impulses to prevent them from being transmitted to the inner hub 11b. When engine rpm is increased to a predetermined level, the centrifugal force of the rotating clutch assembly moves the weights 71 radially outwardly against the force of springs 74 so that the stems 73 engage the notches 75 (FIG. 14) to lock the outer hub 38b to the inner hub 11b, and rotation of the plates 15b and 28b causes compression of the damper springs 57b, and relative rotation of the plates to the hub assembly causes friction damping through the friction plates 51b. Once the centrifugal weights lock the hubs together, the substantially frictionless first stage is then inoperative.

FIGS. 15 and 16 disclose a fourth embodiment of clutch damper assembly 77 which is substantially identical to the embodiment of FIGS. 12-14 except for the omission of the notches in the inner periphery 42c of the annular ring 39c of the outer hub 38c. In this version, the first stage provides a low spring rate substantially frictionless damping to cushion engine impulses in the same manner as previously described. However, when the engine reaches a predetermined rpm, the centrifugal weights 71c acting against the yieldable springs 74c move radially outward to wedge against the inner periphery 42c and frictionally lock the inner hub 11c and outer hub 38c together so that the damper provides a resilient and friction damping operation in the manner previously described.

A fifth embodiment of clutch damper assembly 79 is shown in FIGS. 17, 18 and 19 which is similar to the embodiment of FIGS. 12-14. In this embodiment, the inner hub 11d has a pair of oppositely disposed flange portions 14d with diverging edges 34d having spring recesses 63d and corner notches 81. The arcuate periphery 35d has a notch 82 receiving a generally I-shaped centrifugal weight 83; the notch 82 and weight 83 having facing spring recesses 84,84 on the opposite sides to receive retractor springs 85.

The outer hub 38d includes an annular ring 39d having elongated notches 41d in the outer periphery for the stop pins 21d joining the clutch plate 15d and spring retainer plate 28d, a generally circular inner periphery 42d interrupted by a pair of oppositely disposed inwardly extending flange portions 43d having converging edges 44d, inward corner portions 86 adjacent the edges and adapted to be conformably received in the corner notches 81, and a recess 87 adapted to receive the outer edge of each weight 83. The edges 44d are provided with spring recesses 65d facing the recesses 63d to receive the idle rattle springs 58d.

The inner end of each flange portion 43d has an arcuate recess 88 providing a reduced thickness inner end, with the recesses providing piloting of the friction plates 51d; each flange portion having a central opening 89 to receive the inwardly bent tabs 52d of the friction plates. The inner circumference of the friction plates acts to pilot rotation of the inner hub 11d, and the gaps or spaces 49d are provided between the inner and outer hub flange portions 14d and 43d for the first stage of operation.

Each outer hub flange portion 43d is provided with a pair of spring windows 47d to receive the damper springs 57d for the single stage of resilient damping with friction damping once the inner and outer hubs have been locked together by the centrifugal weights 83 at a predetermined value of rotation, such as 800 rpm. This embodiment operates in substantially the same manner as the version of FIGS. 12—14.

FIGS. 20, 21 and 22 disclose a sixth embodiment of clutch damper assembly 91 wherein the device has been simplified and the components rearranged. In this version, the inner hub 11e has a pair of oppositely disposed flange portions 92 with slightly converging edges 93,93 terminating in arcuate outer edges 94,95. In the upper edge 94, as seen in Figure 20, the flange portion has a notch 82e receiving a centrifugal weight 83e; both the notch and the weight having oppositely facing recesses 84e for retractor springs 85e. In the lower edge 95, a recess 96 faces a corresponding recess 107 in the outer hub 38e for an idle rattle spring 97.

The outer hub 38e includes an annular ring 39e with elongated notches 41e in the outer periphery to receive the stop pins 21e joining the plates 15e and 28e, and an inner periphery having a pair of generally parallel chords forming edges 98,98 with central arcuate edge portions 99,99 piloting the inner hub 11e; the chordal edges forming a generally rectangular opening receiving the inner hub with gaps 101 between the flange portions 92 and the edges 98 for the idle rattle stage. Each edge 98 adjacent the arcuate surfaces 102 and 103 formed from the inner periphery of the outer hub 38e has recesses 104 receiving resilient impact cushions 105 to prevent metal to metal contact between the inner and outer hubs.

The arcuate surface 102 has a recess 106 to receive the outer end of the centrifugal weight 83e, and the arcuate surface 103 has the idle rattle spring recess 107 facing the recess in the edge 95 of the inner hub flange portion. Each outer hub segment 108 formed by the chordal edges 98 has a spring window 109 axially aligned with windows in the plates 15e and 28e to receive the damper springs 57e for the single stage torsional damping stage with friction damping. Between the opposite surfaces of the inner and outer hubs and the plates 15e and 28e are located a pair of friction back plates 111 (FIG. 22), each plate having a central opening journalled on the inner hub barrel 12e, an outer circumference 112 generally coinciding with the arcuate surfaces 102,103 and a pair of oppositely disposed notches 113 coinciding with the spring windows 109 to receive the damper springs 57e. Also, annular friction shims 114 are located between the back plates 111 and the plates 15e and 28e. This embodiment of damper assembly operates in substantially the same way as the three previous embodiments to provide an idle anti-rattle stage and then at a predetermined rpm, the inner and outer hubs lock up through the centrifugal weight so that the torsional damper springs and friction damping take over.

I claim:

1. In a multi-stage torsional damping device providing a low rate, substantially frictionless primary stage to eliminate idle gear rattle and a normal rate final stage with both resilient and friction damping, including a hub assembly having a barrel receiving a transmission input shaft, a clutch driven plate journalled on said hub barrel and carrying annular friction facings at its outer periphery, a spring retainer plate secured in spaced relation to said clutch driven plate by a plurality of stop pins, said plates sandwiching said hub assembly therebetween, the improvement comprising a two-part hub assembly including an inner hub having said hub barrel and a pair of oppositely disposed radially outwardly extending inner hub flange portions having diverging edges, an outer hub having an annular ring with an inner periphery encompassing said flange portions and integral radially inwardly extending outer hub flange portions with converging edges between the inner hub flange portions, said outer hub flange portions having spring windows axially aligned with complementary spring windows in said plates, a pair of friction plates on opposite sides of said hub assembly and positioned between said hub assembly and said plates, said friction plates being operatively connected to said outer hub, radial gaps between said inner and outer hub flange portions, said outer hub ring and flange portions and said inner hub flange portions having complementary corner notches forming elongated slots for said stop pins and facing recesses in the edges receiving idle rattle damper springs therein, each said inner hub flange portion having an outer periphery with a relatively deep notch opening thereinto, a complementary centrifugal weight received in each notch for radial reciprocation therein and having an outer end adapted to project from the flange portion periphery to engage the annular ring of the outer hub to lock the hubs together, retractor springs in each notch for each weight, and at least one pair of damper springs received in said aligned spring windows.

2. A multi-stage torsional damping device as set forth in claim 1, in which said notches and complementary weights are T-shaped with an inner head and an oppositely disposed outer end, said retractor springs acting against the head of the weight and the outer end adapted to project from the periphery of the flange portion.

3. A multi-stage torsional damping device as set forth in claim 2, wherein said outer hub ring has an inner periphery with a pair of oppositely disposed recesses therein adapted to receive the outer ends of said weights to lock the hubs together.

4. A multi-stage torsional damping device as set forth in claim 1, in which said complementary weights are generally I-shaped, the edges of each notch and each weight having facing recesses receiving retractor springs, and the inner periphery of the outer hub ring having a pair of oppositely disposed recesses adapted to receive the outer ends of the weights.

5. In a multi-stage torsional damping device providing a low rate, substantially frictionless primary stage to eliminate idle gear rattle and a normal rate final stage with both resilient and friction damping, including a hub assembly having a barrel receiving a transmission input shaft, a clutch driven plate journalled on said hub barrel and carrying annular friction facings at its outer periphery, a spring retainer plate secured in spaced relation to said clutch driven plate by a plurality of stop pins, said plates sandwiching said hub assembly therebetween, the improvement comprising a two-part hub assembly including an inner hub having said hub barrel and a pair of oppositely disposed, radially outwardly extending sector-shaped inner hub flange portions, an outer hub having an annular ring encompassing said flange portions and integral radially inwardly extending sector-shaped outer hub flange portions between the inner hub flange portions, a pair of friction plates on opposite sides of said hub assembly and positioned between said hub assembly and said plates, said friction plates being operatively connected to said outer hub, radial gaps between said inner and outer hub flange portions, at least one idle rattle damper spring operatively connected between said inner and outer hub flange portions, said inner hub flange portions having corner recesses and said outer hub flange portions having complementary corners, the edges of the flange portions having facing recesses receiving said idle rattle damper springs, each outer hub flange portion having a pair of spring windows axially aligned with spring windows in said plates to receive damper springs, each said inner hub flange portion having an outer periphery with a notch opening thereinto, a generally I-shaped centrifugal weight received in said notch for radial reciprocation therein, the edges of each notch and each weight having facing recesses receiving retractor springs, and the inner periphery of the outer hub ring having a pair of oppositely disposed recesses adapted to receive the outer ends of the weights to lock the hubs together.

6. In a multi-stage torsional damping device providing a low rate, substantially frictionless primary stage to eliminate idle gear rattle and a normal rate final stage with both resilient and friction damping, including a hub assembly having a barrel receiving a transmission input shaft, a clutch driven plate journalled on said hub barrel and carrying annular friction facings at its outer periphery, a spring retainer plate secured in spaced relation to said clutch driven plate by a plurality of stop pins, said plates sandwiching said hub assembly therebetween, the improvement comprising a two-part hub assembly including an inner hub having said hub barrel and a pair of oppositely disposed radially outwardly extending inner hub flange portions having outwardly converging edges terminating in arcuate peripheries, one of said flange portions having a relatively deep notch therein, a complementary centrifugal weight received in said notch, the notch and weight having facing recesses, a pair of retractor springs received in said facing recesses, the opposite flange portion having a central recess, an outer hub having an annular ring encompassing said flange portions and integral radially inwardly extending outer hub flange portions between the inner hub flange portions, said outer hub ring having a recess facing said last-mentioned recess to receive an idle rattle damper spring and an oppositely disposed recess adapted to receive an end of said weight, said outer hub flange portions having spring windows axially aligned with complementary spring windows in said plates, a pair of friction plates on opposite sides of said hub assembly and positioned between said hub assembly and said plates, said friction plates being operatively connected to said outer hub, radial gaps between said inner and outer hub flange portions, and at least one pair of damper springs received in said aligned spring windows, said outer hub ring having elongated notches therein receiving said stop pins.

7. A multi-stage torsional damping device as set forth in claim 6, in which said outer hub flange portions are segments of a circle formed by substantially parallel chords of the outer hub ring, the parallel edges of the outer hub flange portions having recesses, and a resilient impact cushion received in each last mentioned recess to be engaged by an edge of an inner hub flange portion.

8. A multi-stage torsional damping device as set forth in claim 7, in which said friction plates are generally circular back plates, each back plate having a pair of oppositely disposed notches axially aligned with said spring windows to receive the damper springs.

* * * * *